United States Patent
Kawasaki et al.

(10) Patent No.: US 6,878,778 B1
(45) Date of Patent: Apr. 12, 2005

(54) FLUOROELASTOMER COMPOSITION FOR CROSSLINKING

(75) Inventors: Kazuyoshi Kawasaki, Settsu (JP); Tsuyoshi Itagaki, Tsukuba (JP); Katsuhiko Iseki, Tsuchiura (JP); Takafumi Yamato, Settsu (JP); Tsuyoshi Noguchi, Settsu (JP); Mitsuru Kishine, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 305 days.

(21) Appl. No.: 10/129,375

(22) PCT Filed: Oct. 31, 2000

(86) PCT No.: PCT/JP00/07670

§ 371 (c)(1),
(2), (4) Date: May 3, 2002

(87) PCT Pub. No.: WO01/32773

PCT Pub. Date: May 10, 2001

(30) Foreign Application Priority Data

Nov. 4, 1999 (JP) ............................................ 11-314274

(51) Int. Cl.$^7$ ............................................ C08F 259/08
(52) U.S. Cl. ....................................... 525/275; 525/276
(58) Field of Search .................................. 525/275, 276

(56) References Cited

U.S. PATENT DOCUMENTS 3,310,573 A    3/1967    Coc

FOREIGN PATENT DOCUMENTS

JP    59-232137    12/1984

OTHER PUBLICATIONS

Journal of Polymer Science: A Polymer Chemistry Edition, vol. 20, No. 9, (1982), K. S. Y. Lau et al., "Synthesis of Polymer Intermediates Containing the Hexafluoroisopropylidene Group via Functionalization of 2, 2–Diphenylhexafluoropropane", pp. 2381–2393.

*Primary Examiner*—Robert D. Harlan
(74) *Attorney, Agent, or Firm*—Sughrue Mion, PLLC

(57) ABSTRACT

An elastomer composition for crosslinking which comprises (A) a compound having at least two crosslinkable reactive groups represented by the formula (I):

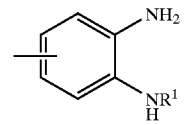

wherein $R^1$ are the same or different and each is fluorine atom or a monovalent organic group, and (B) an elastomer having a curing site capable of reacting with the crosslinkable reactive group (I). The composition provides a crosslinked article which possesses improved mechanical strength and heat resistance and has excellent chemical resistance.

30 Claims, 1 Drawing Sheet

FLUOROELASTOMER COMPOSITION FOR CROSSLINKING

TECHNICAL FIELD

The present invention relates to an elastomer composition for crosslinking which can provide a crosslinked rubber molded article having good sealing property and excellent mechanical strength and heat resistance at high temperatures, and particularly relates to a fluorine-containing elastomer composition for crosslinking.

BACKGROUND ART

Fluorine-containing elastomers, particularly perfluoro elastomers mainly comprising a tetrafluoroethylene (TFE) unit are widely used as a sealing material used under hard environment because of excellent chemical resistance, solvent resistance and heat resistance thereof.

However requirements for characteristics have become rigorous with the advance of technology. In the fields of aeronautics, space, semi-conductor production apparatuses and chemical plants, a sealing property under high temperature environment of 300° C. or more is demanded.

To cope with such requirements, proposals have been made to enhance heat resistance by improving a crosslinking system, and there are known crosslinking systems, for example, a triazine crosslinking system for forming a triazine ring with an organotin compound by using a fluorine-containing elastomer having a nitrile group introduced as a crosslinking point (for example, JP-A-58-152041), an oxazol crosslinking system for forming an oxazol ring with bisaminophenol similarly by using a fluorine-containing elastomer having a nitrile group introduced as a crosslinking point (for example, JP-A-59-109546), an imidazole crosslinking system for forming an imidazole ring with a tetramine compound (for example, JP-A-59-109546) and a thiazole crosslinking system for forming a thiazole ring with bisaminothiophenol (for example, JP-A-8-104789).

Among those crosslinking systems, when crosslinking a nitrile group-containing perfluoro elastomer with a tetramine compound, heat resistance of the obtained crosslinked rubber molded article is enhanced as compared with conventional crosslinking systems, but the molded article is deteriorated remarkably at high temperature exceeding 300° C. as compared with the triazine crosslinking and oxazole crosslinking systems.

On the other hand in the triazine crosslinking and oxazole crosslinking systems, the molded article is deteriorated significantly against amines and high temperature steam, and therefore application thereof is limited.

An object of the present invention is to provide an elastomer composition for crosslinking which can give a crosslinked rubber molded article possessing particularly improved mechanical strength and heat resistance at high temperatures and having excellent chemical resistance.

Another object of the present invention is to provide a novel crosslinking agent.

DISCLOSURE OF INVENTION

Namely the present invention relates to an elastomer composition for crosslinking which comprises (A) a compound having at least two crosslinkable reactive groups represented by the formula (I):

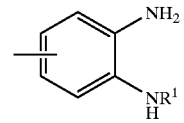

wherein $R^1$ are the same or different and each is fluorine atom or a monovalent organic group, and (B) an elastomer having a curing site capable of reacting with the crosslinkable reactive group (I).

The compound (A) is a novel crosslinking agent since its action as a crosslinking agent has not been known.

Example of the compound (A) is preferably a compound represented by the formula (II):

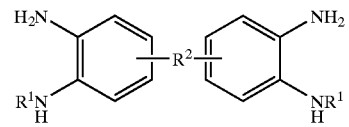

wherein $R^1$ are as defined above, $R^2$ is —$SO_2$—, —O—, —CO—, an alkylene group which may have been substituted,

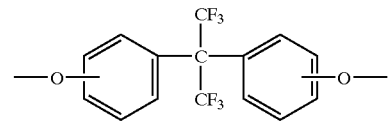

or a single bond.

Example of the elastomer (B) which can be used preferably is a fluorine-containing elastomer, particularly a perfluoro elastomer having a nitrile group, a carboxyl group and/or an alkoxycarbonyl group as a curing site.

Among the above-mentioned compounds (A), the compound represented by the formula (III):

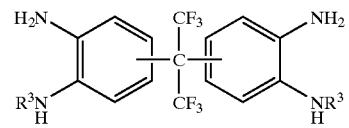

wherein $R^3$ is an alkyl group which has 1 to 6 carbon atoms and may have been substituted, is a novel compound which is an object of the present invention.

The present invention also relates to a crosslinked rubber molded article obtained by crosslinking the elastomer composition for crosslinking of the present invention.

BEST MODE FOR CARRYING OUT THE INVENTION

Figure 1:
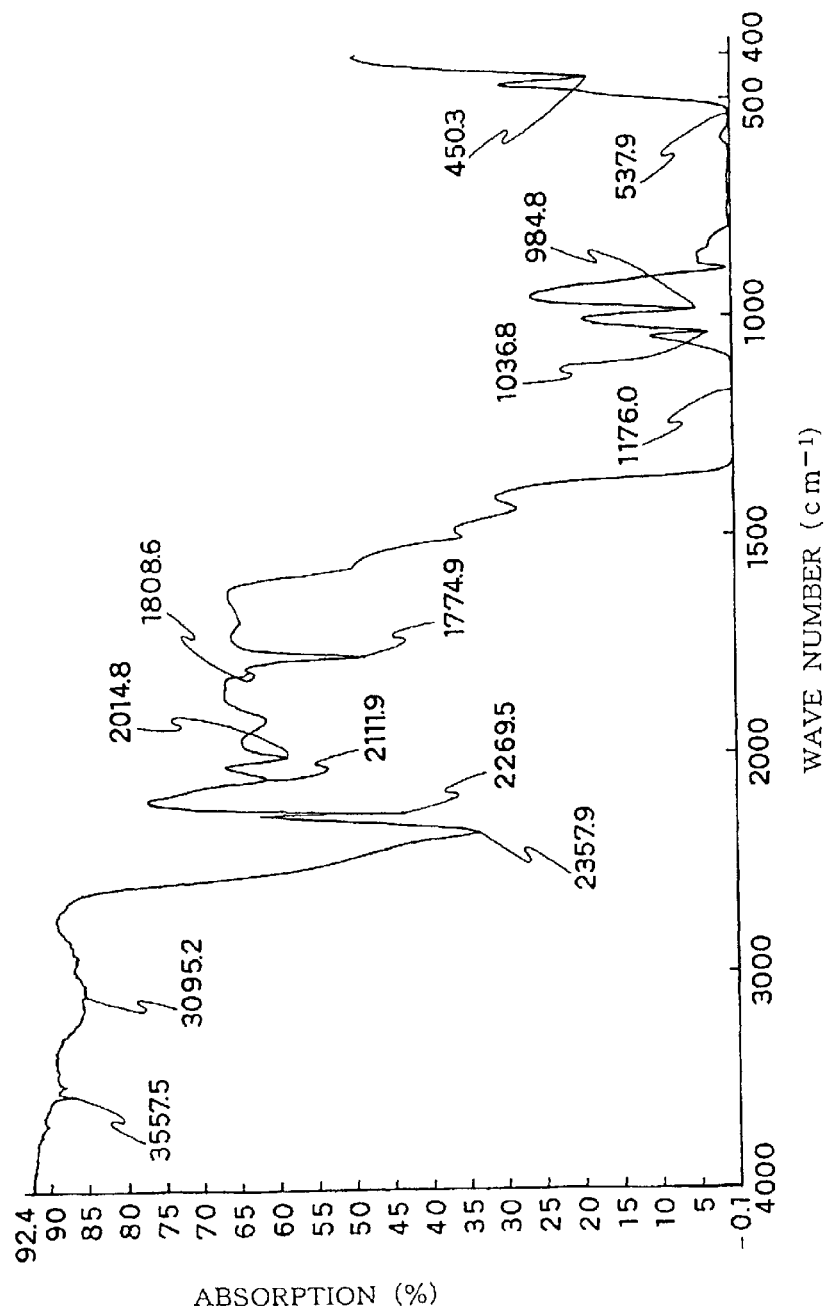
FIG. 1 is a chart of infrared spectroscopic analysis of a fluorine-containing elastomer A having a CN group which was obtained in Preparation Example 1.

When the elastomer composition for crosslinking of the present invention is crosslinked, its crosslinking system is analogous to an imidazole crosslinking system. Namely, in conventional imidazole crosslinking, for example, a crosslinking structure:

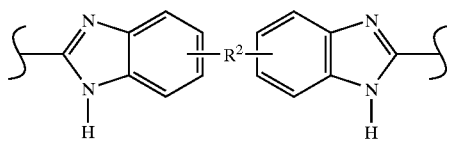

is formed, but in the present invention, as represented by:

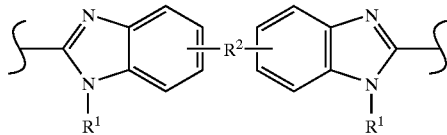

there is a N—$R^1$ bond instead of a N—H bond of the imidazole ring. It can be considered that this N—$R^1$ bond greatly contributes to enhancement of heat resistance. Therefore in the present invention, the compound (A) acting as a crosslinking agent is an important factor. The compound (A) is explained hereinbelow.

The compound (A) has at least two crosslinkable reactive groups represented by the formula (I), preferably two or three groups, particularly preferably two groups in order to form the crosslinking structure.

In the crosslinkable reactive group (I), the substituent $R^1$ is a monovalent organic group other than hydrogen or fluorine atom, and particularly preferred is a substituent forming the N—$R^1$ bond having a higher anti-oxidizing property than the N—H bond. The "substituent forming the N—$R^1$ bond having a higher anti-oxidizing property than the N—H bond" means a substituent forming the N—$R^1$ bond which is present in a compound hardly oxidized as compared with a compound having the N—H bond when the compound (A) forms an imidazole ring.

$R^1$ is not limited particularly, and examples thereof are an aliphatic hydrocarbon group which may have been substituted or a benzyl group or phenyl group which may have been substituted.

At least one of $R^1$ is, for instance, a lower alkyl group having 1 to 10 carbon atoms, particularly 1 to 6 carbon atoms such as —$CH_3$, —$C_2H_5$ or —$C_3H_7$; a fluorine atom-containing lower alkyl group having 1 to 10 carbon atoms, particularly 1 to 6 carbon atoms such as —$CF_3$, —$C_2F_5$, —$CH_2F$ —$CH_2CF_3$ or —$CH_2C_2F_5$; a phenyl group; a benzyl group; a benzyl group or phenyl group in which 1 to 5 hydrogen atoms have been substituted by fluorine atoms such as —$C_6F_5$ or —$CH_2C_6F_5$; a benzyl group or phenyl group in which 1 to 5 hydrogen atoms have been substituted by —$CF_3$ such as —$C_6H_{5-n}(CF_3)_n$ or —$CH_2C_6H_{5-n}(CF_3)_n$, wherein n is an integer of from 1 to 5; or the like.

Among them, a phenyl group and —$CH_3$ are preferred from the viewpoint of particularly excellent heat resistance, good crosslinkability and relatively easy synthesis.

Preferred compound (A) is a compound having at least two crosslinkable reactive groups (I) and represented by the formula (II):

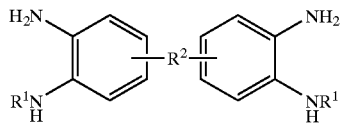

from the viewpoint of easy synthesis. In the formula, $R^1$ is as defined above. In the right and left crosslinkable reactive groups (I), the positions of $NH_2$ and $NHR^1$ to the phenyl group may be the same or reverse.

In the compound represented by the formula (II), $R^2$ is —$SO_2$—, —O—, —CO—, an alkylene group which may have been substituted,

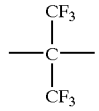

or a single bond.

Non-restricted examples of the preferable alkylene group $R^2$ which may have been substituted are, for instance, a non-substituted alkylene group having 1 to 6 carbon atoms or a perfluoro alkylene group having 1 to 10 carbon atoms. Examples of the perfluoro alkylene group are:

$$\begin{array}{c} CF_3 \\ | \\ -C- \\ | \\ CF_3 \end{array}$$

and the like. Those $R^2$ are known as examples of bisdiaminophenyl compounds described in JP-B-2-59177, JP-A-8-120146, etc.

$R^2$ may be bonded to any positions of the right and left benzene rings but it is preferable that $R^2$ is bonded so that either of $NH_2$ group or $NHR^1$ group is located at para-position with respect to $R^2$ from the viewpoint of easy synthesis and easy crosslinking reaction.

Example of the preferable compound (A) is the compound represented by the formula (IV):

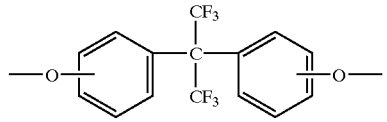

wherein $R^4$ are the same or different and each is an alkyl group having 1 to 10 carbon atoms, an alkyl group having fluorine atom and 1 to 10 carbon atoms, a phenyl group, a benzyl group, or a phenyl group or benzyl group in which 1 to 5 hydrogen atoms have been substituted by fluorine atom or —$CF_3$.

Non-restricted examples of the compound are, for instance, 2,2-bis-[3-amino-4-(N-methylamino)phenyl] hexafluoropropane, 2,2-bis-[3-amino-4-(N-ethylamino) phenyl]hexafluoropropane, 2,2-bis-[3-amino-4-(N-propylamino)phenyl]hexafluoropropane, 2,2-bis-[3-amino-4-(N-phenylamino)phenyl]hexafluoropropane, 2,2-bis-[3-amino-4-(N-perfluorophenylamino)phenyl]

hexafluoropropane, 2,2-bis-[3-amino-4-(N-benzylamino)phenyl]hexafluoropropane, and the like.

The compound (A) explained above is a novel crosslinking agent, has excellent mechanical strength, heat resistance and chemical resistance and provides a crosslinked product having a particularly well-balanced heat resistance and chemical resistance.

Further among the compounds (A), the compound represented by the formula (III):

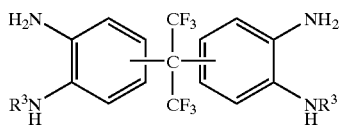

wherein $R^3$ is an alkyl group which has 1 to 6 carbon atoms and may have been substituted, is a novel compound.

In Journal of Polymer Science, edited by Polymer Chemistry, Vol. 20, pg. 2381 to 2393 (1982), 2,2-bis-[3-amino-4-(N-phenylamino)phenyl]hexafluoropropane is synthesized as a monomer.

Then the crosslinkable elastomer as the component (B) is explained below.

The crosslinkable elastomer (3) may be an elastomer which has a curing site capable of reacting with the crosslinkable reactive group (I) and is excellent in heat resistance. Examples thereof are, for instance, fluorine-containing elastomers.

Examples of the curing site capable of reacting with the crosslinkable reactive group (I) are a nitrile group (—CN group), carboxyl group (—COOH group) and alkoxycarbonyl group (—COOR group, R is an alkyl group having 1 to 3 carbon atoms).

Examples of the preferable fluorine-containing elastomer are crosslinkable fluorine-containing elastomers which have a carboxyl group, nitrile group and/or alkoxycarbonyl group as a curing site on an end of a trunk chain and/or a branched chain and are represented by the formula (V):

$X^1$—[A—$(Y)_p]_q$—$X^2$ (V)

or the formula (VI):

$X^1$—[A—$(Y^1)_p]_q$—[B—$(Y^2)_r]_s$—$X^2$ (VI)

wherein $X^1$ and $X^2$ are the same or different and each is a carboxyl group, alkoxycarbonyl group, nitrile group, iodine atom, bromine atom or sulfonic acid group, Y, $Y^1$ and $Y^2$ are the same or different and each is a divalent organic group having a carboxyl group, alkoxycarbonyl group or nitrile group on its side chain, A is an elastomeric fluorine-containing polymer chain segment (hereinafter referred to as "elastomeric segment A"), B is a non-elastomeric fluorine-containing polymer chain segment (hereinafter referred to as "anon-elastomeric segment B"), p is 0 or an integer of from 1 to 10, q is an integer of from 1 to 5, r is 0 or an integer of from 1 to 10, s is an integer of from 1 to 3, any one of $X^1$, $X^2$, Y, $Y^1$ and $Y^2$ is a carboxyl group or an alkoxycarbonyl group and Y, $Y^1$ and $Y^2$ may be contained at random in the segment A or B.

The elastomeric segment A may be, for example, perfluoro elastomer segments such as a copolymer rubber represented by the formula (1):

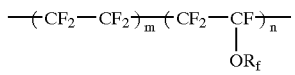

wherein m/n is 95 to 50/5 to 50 (in mole ratio), $R_f$ is a fluoropolyoxyalkyl group having 1 to 20 carbon atoms or a perfluoroalkyl group having 1 to 8 carbon atoms and a terpolymer rubber represented by the formula (2):

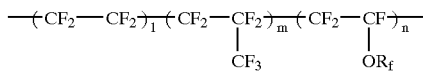

wherein l/m/n is 95 to 35/0 to 30/5 to 35 (in mole ratio), $R_f$ is a fluoropolyoxyalkyl group having 1 to 20 carbon atoms or a perfluoroalkyl group having 1 to 8 carbon atoms, or non-perfluoro elastomer segments such as a copolymer rubber represented by the formula (3):

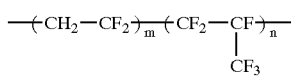

wherein m/n is 85 to 60/15 to 40 (in mole ratio), a terpolymer rubber represented by the formula (4):

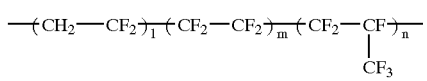

wherein l/m/n is 85 to 20/0 to 40/15 to 40 (in mole ratio), a terpolymer rubber represented by the formula (5):

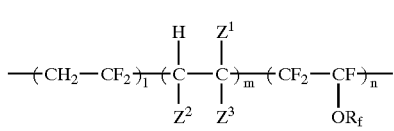

wherein l/m/n is 95 to 45/0 to 10/5 to 45 (in mole ratio), $Z^1$, $Z^2$ and $Z^3$ are fluorine atom or hydrogen atom independently, $R_f$ is a fluoropolyoxyalkyl group having 1 to 20 carbon atoms or a perfluoroalkyl group having 1 to 8 carbon atoms,

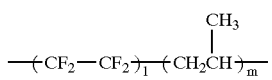

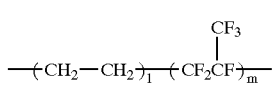

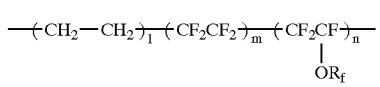

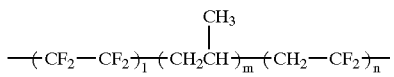

(l/m/n is 1 to 80/0 to 80/10 to 50 (in mole ratio), $R_f$ is as defined above).

Examples of Y, $Y^1$ and $Y^2$ for introducing a curing site in the branched chain are, for instance, iodine-containing monomers represented by $CX_2=CX—R_f^1CHRI$, wherein X is H, F or $CH_3$, $R_f^1$ is a linear or branched fluoro or perfluoro alkylene group, fluoro or perfluoro oxyalkylene group, fluoro polyoxyalkylene group or perfluoro polyoxyalkylene group which may have one or more ether type oxygen atoms, R is H or $CH_3$, bromine-containing monomers, nitrile group-containing monomers represented by:

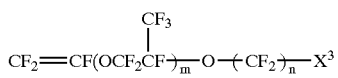

wherein m is from 0 to 5, n is from 1 to 8,

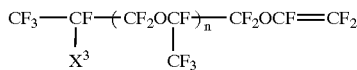

wherein n is from 1 to 4,

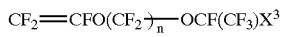

wherein n is from 2 to 5,

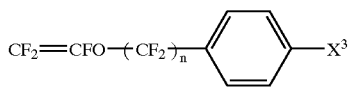

wherein n is from 1 to 6,

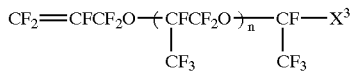

wherein n is from 1 to 5, in which $X^3$ is CN, COOH or $COOR^5$, in which $R^5$ is a C1 to C10 alkyl group which may have fluorine atom, carboxyl group-containing monomers, alkoxycarbonyl group-containing monomers, and the like. Usually iodine-containing monomers, nitrile group-containing monomers and carboxyl group-containing monomers are suitable.

From the viewpoint of copolymerizability, examples of the suitable iodine-containing monomer are perfluoro(vinyl ether) compounds, for instance, perfluoro(6,6-dihydro-6-iodo-3-oxa-1-hexene), perfluoro(5-iodo-3-oxa-1-pentene), and the like.

In addition, there are fluoro vinyl ethers described in JP-B-5-63482 and represented by the formula:

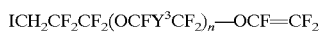

wherein $Y^3$ is a trifluoromethyl group, n is from 0 to 2.

Also $CF_2=CHI$, and the like can be used suitably.

When at least one of the end groups $X^1$ and $X^2$ is carboxyl group or alkoxycarbonyl group, a unit having nitrile group or carboxyl group is preferable from the viewpoint of crosslinkability.

The non-elastomeric segment B is not limited basically as far as the segment contains fluorine atom and does not have the above-mentioned elastomeric property. The non-elastomeric segment B may be selected depending on properties and functions intended to obtain by block copolymerization thereof. Particularly a crystalline polymer chain segment having a crystalline melting point of not less than 150° C. is preferred in order to impart mechanical properties.

Among the monomers capable of constituting the non-elastomeric segment B, examples of the fluorine-containing monomer are, for instance, one or more of perhalo olefins such as TFE, chlorotrifluoroethylene (CTFE), perfluoro (alkyl vinyl ether) (PAVE), hexafluoropropylene (HFP), $CF_2=CF(CF_2)_pX$, wherein p is an integer of from 1 to 10, X is F or Cl and perfluoro-2-butene; and partly fluorinated olefins such as vinylidene fluoride, vinyl fluoride, trifluoroethylene,

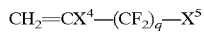

wherein $X^4$ and $X^5$ are H or F, q is an integer of from 1 to 10, and $CH_2=C(CF_3)_2$. Also one or more monomers copolymerizable therewith, for example, ethylene, propylene, vinyl chloride, vinyl ethers, carboxylic acid vinyl esters and acryls can be used as copolymerizable components.

Among them, from the viewpoint of chemical resistance and heat resistance, preferable examples of the monomer which is used as a main component are, for instance, a sole use of fluorine-containing olefin, a combination use of fluorine-containing olefins, a combination use of ethylene and TFE and a combination use of ethylene and CTFE. Particularly a sole use of perhalo olefin and a combination use of perhalo olefins are preferable.

Examples thereof are
(1) VdF/TFE (0 to 100/100 to 0), particularly VdF/TFE (70 to 99/30 to 1), PTFE or PVdF;
(2) ethylene/TFE/HFP (6 to 60/40 to 81/1 to 30), 3,3,3-trifluoropropylene-1,2-trifluoromethyl-3,3,3-trifluoropropylene-1/PAVE (40 to 60/60 to 40);
(3) TFE/$CF_2=CF-R_f^3$ (amount exhibiting non-elastomeric property, namely, an amount of $CF_2=CF—R_f^3$ is not more than 15% by mole. $R_f^3$ is a linear or branched fluoro or perfluoro alkyl group or fluoro or perfluoro oxyalkyl group which may have at least one ether type oxygen atom);
(4) VdF/TFE/CTFE (50 to 99/30 to 0/20 to 1);
(5) VdF/TFE/HFP (60 to 99/30 to 0/10 to 1);
(6) ethylene/TFE (30 to 60/70 to 40);
(7) polychlorotrifluoroethylene (PCTFE);
(8) ethylene/CTFE (30 to 60/70 to 40); and the like. Figures in the parentheses represent % by mole. Among them, from the viewpoint of chemical resistance and heat resistance, non-elastomeric copolymers, particularly PTFE and TFE/$CF_2=CF—R_f^3$ ($R_f^3$ is as defined above) are preferable.

Also the above-mentioned unit $Y^2$ giving curing sites may be introduced for various crosslinking systems as a monomer capable of constituting the non-elastomeric segment B in an amount of not more than 5% by mole, preferably not more than 2% by mole.

A block copolymerization of the non-elastomeric segment B can be carried out, for example, by changing to the monomer for the non-elastomeric segment B subsequently to emulsion polymerization of the elastomeric segment A.

The number average molecular weight of the non-elastomeric segment B can be adjusted in the wide range of from 1,000 to 1,200,000, preferably from 3,000 to 400,000.

The non-elastomeric segment B can be surely block-copolymerized with the elastomeric segment A when the elastomeric segment A comprises not less than 90% by mole, particularly not less than 95% by mole of perhalo olefin unit as a component unit thereof. And also the molecular weight (degree of polymerization) of the non-elastomeric segment B can be increased.

As mentioned above, $X^1$ and $X^2$ which are the end groups of the elastomer are carboxyl group, alkoxycarbonyl group, iodine atom, bromine atom or sulfonic acid group. Example of the method for introducing such a functional group to the ends of the elastomer is a method of treating with an acid which is described hereinafter.

In the present invention, as mentioned above, fluorine-containing elastomers in which at least one of $X^1$, $X^2$, Y, $Y^1$ and $Y^2$ capable of becoming a curing site is a nitrile group, carboxyl group or alkoxycarbonyl group are used preferably. Among them, the above-mentioned fluorine-containing elastomer having carboxyl group at an end of a trunk chain thereof (namely, at least one of $X^1$ and $X^2$ is carboxyl group) is a novel elastomer.

The fluorine-containing elastomers (V) and (VI) are characterized in that they are not polymerization products but fluorine-containing elastomers isolated from a polymerization reaction mixture. Therefore those elastomers are in the state of so-called mass and can be crosslinked by adding a crosslinking agent or by irradiation of high energy rays.

So the fluorine-containing elastomers represented by the above-mentioned formulae (V) and (VI) have not been present in the crosslinkable state.

From the viewpoint of securing curing sites to enhance heat resistance and not to lower mechanical properties such as compression set at high temperatures, it is preferable that the content of carboxyl group in the fluorine-containing elastomers of the present invention represented by the formulae (V) and (VI) satisfies the following equation (1).

$$(Sco/Scf) \times (D/Dp) \times (F/Fp) \geq 0.01$$

Then the abbreviations in the equation (1) are explained below.

Sco, Scf, D, Dp, F and Fp in the equation represent the following respective values of the aimed fluorine-containing elastomer and a standard perfluoro elastomer mentioned below. Sco: Total area of absorbances at the absorptions derived from carbonyl group of associated and non-associated carboxyl groups having the absorption peaks at from 1,680 to 1,830 cm$^{-1}$ when measurement is made with FT-IR with respect to the elastomer to be measured. For example, in case of TFE/perfluoro(methyl vinyl ether) (PMVE)/$CF_2$=$CFOCF_2CF(CF_3)OCF_2CF_2X$, in which X is CN or COOH, an absorption derived from the associated carbonyl group appears at 1,800 to 1,820 cm$^{-1}$ and an absorption derived from the non-associated carbonyl group appears at 1,760 to 1,780 cm$^{-1}$.

Scf: Area of absorbance at absorption derived from a harmonic sound of C—F bond having an absorption peak at from 2,220 to 2,840 cm$^{-1}$ when measurement is made with FT-IR with respect to the elastomer to be measured. In case where nitrile group is present, Scf is a value obtained by subtracting an area of absorbance at absorption derived from nitrile group having an absorption peak at from 2,220 to 2,300 cm$^{-1}$ from a total area of absorbance at whole absorption having a peak at from 2,220 to 2,840 cm$^{-1}$. This correction is made to eliminate an influence of absorption derived from nitrile group since a peak of the absorption appears at from 2,220 to 2,300 cm$^{-1}$ when nitrile group is present.

D: Specific gravity at 20° C. of the elastomer to be measured.

Dp: Specific gravity (measured value: 2.03) at 20° C. of a standard perfluoro elastomer (copolymer of TFE/PMVE in a mole ratio of 58/42, measured with $^{19}$F-NMR). The reason why the copolymer comprising TFE/PMVE in a mole ratio of 58/42 is used as a standard perfluoro elastomer is that it is easily obtainable.

F: Fluorine content (% by weight) of the elastomer to be measured which is obtained by elemental analysis.

Fp: Fluorine content (measured value: 71.6% by weight) of the above-mentioned standard perfluoro elastomer which is obtained by elemental analysis.

Then explained below is a meaning which the equation (1) has.

The term Sco/Scf is a proportion of carbonyl group (carbonyl group of carboxyl group, hereinafter the same) to C—F bond in the perfluoro elastomer. In case where the fluorine-containing elastomer of the present invention is a perfluoro elastomer, only this term may be used. Namely, Sco/Scfp$\geq$0.01 (Scfp: Area absorbance of C—F bond of the perfluoro elastomer).

The terms D/Dp and F/Fp are those used for correction in case where the fluorine-containing elastomer (VI) has a non-perfluoro elastomer, for example, vinylidene fluoride. Namely, when the non-perfluoro monomer such as vinylidene fluoride is copolymerized, an amount of C—F bonds in the elastomer decreases and an area of absorbance of C—F bonds measured with a transmission IR analyzer decreases.

In general in case where the measurement is made with a transmission IR, an area absorbance of C—F is proportional to the number of moles of fluorine atoms per a unit area of the elastomer (a value obtained by dividing a weight of fluorine atom by an atomic weight 19 of fluorine). Thereby a weight of perfluoro elastomer having a volume V is V×Dp (Dp is a specific gravity of perfluoro elastomer), and thus a weight of fluorine in the perfluoro elastomer is V×Dp×Fp/100 (Fp is a fluorine content of the perfluoro elastomer (Fp % by weight)) and the number of moles of fluorine is V×Dp×Fp/1900. Similarly the number of moles of fluorine in a non-perfluoro elastomer having a volume V is V×D×F/1900 (D and F are a specific gravity and fluorine content of the non-perfluoro elastomer, respectively).

Provided that an area of absorbance of C—F bond of the perfluoro elastomer is Scfp and an area of absorbance of C—F bond of the non-perfluoro elastomer is Scf, since the area of absorbance of C—F bond is proportional to the number of moles, an equation Scfp/Scf=VDpFp/VDF is obtained and thus an equation Scfp=(DpFp/DF)×Scf is obtained. When this equation is substituted for the equation Sco/Scfp $\geq$0.01 of the perfluoro elastomer, the above-mentioned equation (1) can be obtained.

In the equation (1), the following measuring methods and apparatuses are used.

(FT-IR Measurement)

Measuring apparatus: FT-IR Spectro Meter Model 1760X available from Perkin Elmer Co., Ltd.

Sample: About 0.1 mm thick film

Measuring conditions: Resolution 2 cm$^{-1}$, Detecting interval 1 cm$^{-1}$, measured by transmission method.

(Elemental Analysis)

Measuring apparatus: Micro Processor Ionalyzer Model 901 available from Orion Research Co., Ltd.

Measuring method: A small amount of $Na_2O_2$ (combustion improver) is added to 1.4 to 1.9 mg of the sample, followed by combustion in a combustion flask containing 25 ml of pure water. After allowing to stand for 30 minutes, 10 ml is sampled and thereto is added 10 ml of a solution (10 liter of a solution comprising 500 ml of acetic acid, 500 g of sodium chloride, 5 g of tri-sodium citrate dihydrate, 320 g of sodium hydroxide and pure water). Then an amount of F ion is measured with F ion meter.

(Specific Gravity)

Measuring apparatus: Automatic densitometer Model D-1 available from Kabushiki Kaisha Toyo Seiki Seisakusho Measuring condition: 20° C.

The equation (1) means that the fluorine-containing elastomer, irrespective of perfluoro elastomer or non-perfluoro elastomer, contains not less than 1 mmol of carboxyl group per 1 kg of the polymer. Particularly preferred is the fluorine-containing elastomer containing from 10 to 250 mmol of carboxyl group. When the elastomer is prepared by copolymerizing a carboxyl group-containing monomer, it is preferable that a copolymerized proportion of the carboxyl group-containing monomer is from 0.3 to 2% by mole. When other crosslinkable functional groups (for example, nitrile group, etc.) are contained, a total amount of those functional groups and carboxyl groups is preferably within the above-mentioned range.

From the viewpoint of enhancement of physical properties of the obtained crosslinked product, carboxyl groups are preferably bonded to the end groups $X^1$ and $X^2$ of the trunk chain.

The above-mentioned fluorine-containing elastomer can be prepared by polymerization methods such as emulsion polymerization, suspension polymerization and solution polymerization.

It is preferable to use a polymerization initiator which makes it possible that carboxyl groups or groups capable of forming carboxyl group (for example, acid fluoride, acid chloride and $CF_2OH$, any of which form carboxyl group in the presence of water) are present at an end of the elastomer. Examples thereof are ammonium persulfate (APS), potassium persulfate (KPS), and the like.

Also a chain transfer agent which is usually used for adjusting a molecular weight may be used. However it is better not to use the chain transfer agent as far as possible because a proportion of the groups capable of forming carboxyl groups or alkoxycarbonyl groups to be introduced into the ends of the elastomer is reduced. In the case where the polymerization initiator can make it possible that the above-mentioned groups are present at the ends of elastomer, however, such a polymerization initiator may be used. When the chain transfer agent is not used, the molecular weight of the elastomer may be adjusted by carrying out the polymerization at a low pressure, for example, at a pressure less than 2 MPa·G, preferably at a pressure of not more than 1 MPa·G. Other polymerization conditions are not limited particularly. However when producing a polymerization product having carboxyl group at an end and/or a branched chain thereof without acid treatment explained below, it is preferable that a pH value of the polymerization system is adjusted to a strong acid having a pH value of not more than 3.

Among the so-obtained polymerization products, some of them do not contain free carboxyl group depending on the polymerization conditions. However by the acid treatment mentioned below, conversion to free carboxyl group can be carried out.

In the present invention it is preferable to carry out an acid treatment of a polymerization product to convert groups such as a metal salt and ammonium salt of carboxylic acid present therein to carboxyl group. Examples of the proper acid treatment method are a method of washing the polymerization product, for example, with hydrochloric acid, sulfuric acid, nitric acid, or the like and a method of adjusting a system of a mixture after the polymerization reaction to a pH value of not more than 3 with such an acid.

It is preferable from the viewpoint of reduction of steps that the acid treatment is applied as means for coagulation when isolating the polymerization product from the polymerization reaction mixture by coagulation. The polymerization product may be isolated by means of freeze drying, or the like after the acid treatment of the polymerization mixture. Further a coagulation method by ultrasonic wave or by mechanical force may be employed.

Also carboxyl group can be introduced by oxidizing a fluorine-containing elastomer containing iodine or bromine with a fuming nitric acid.

An amount of the compound (A) which is a crosslinking agent is preferably from 0.1 to 10 parts by weight based on 100 parts by weight of the elastomer.

To the composition of the present invention can be added additives which are usually added to a crosslinkable elastomer composition as the case demands, for example, a filler, processing aid, plasticizer, coloring agent, and the like. In addition to the above-mentioned additives, one or more of usual crosslinking agent and crosslinking accelerator other than the above-mentioned ones may be blended. Also two or more elastomers may be mixed in a range not lowering an effect of the present invention.

The composition of the present invention can be prepared by mixing each of the above-mentioned components by using usual processing equipment for rubber, for example, an open roll, Banbury mixer, kneader, or the like. In addition, the composition can be prepared also by a method of using a closed mixer and a method of co-coagulation through emulsion mixing.

For producing a pre-molded article from the above-mentioned composition, usual known methods may be employed, such as a method of heating and compressing in a metal mold, a method of putting in a heated metal mold under pressure and a method of extruding with an extruder. In cases of extruded products such as a hose and cable, since shapes thereof can be maintained even after the extruding, a pre-molded article extruded without using a crosslinking agent can be used as it is. Of course, it is possible to use a pre-molded article subjected to crosslinking by heating with steam by using a crosslinking agent. Also in case of a shaped product such as O-ring, when it is difficult to hold a shape of the product in an un-crosslinked state after mold-releasing, it is possible to maintain the shape by using a pre-molded article crosslinked previously by using a crosslinking agent.

A crosslinked product having good physical properties can be obtained at a relatively low crosslinking temperature (for example, from 150° to 230° C., preferably from 170° to 200° C.).

The present invention also relates to the so-obtained crosslinked product. In the crosslinked product of the present invention, a high heat resistance which cannot be obtained by conventional imidazole crosslinking and further excellent mechanical strength and chemical resistance can be provided. Furthermore a variation per a given period of time of a compression set at high temperatures which is an index for evaluating a sealing property essential particularly for a sealing material is reduced.

The crosslinked product of the present invention is useful as various molded articles in the fields shown in Tables 1, 2 and 3 on the following pages.

TABLE 1

| Field of industry | Sub-field of industry | Final product | Equipment | Parts |
|---|---|---|---|---|
| Electrical | Semi-conductor | Semi-conductor production apparatuses Liquid crystal panel production apparatus Plasma panel production apparatus | CVD equipment Dry etching equipment Wet etching equipment Oxidation and diffusion equipment Sputtering equipment Ashing equipment Cleaning equipment Ion implantation equipment | O (square) ring, packing, sealing material, tube, roll Coating, lining, gasket, diaphragm, hose |
| Transportation | Vehicle | Car | Engine and auxiliary devices AT devices Fuel line and auxiliary devices | Gasket, shaft seal, valve stem seal, sealing material, hose Hose, sealing material O (square) ring, tube, packing, core material of valve, hose, sealing material, diaphragm |
| | Aircraft | Aircraft | Fuel line | Diaphragm, O (square) ring, valve, tube, packing, hose, sealing material |
| | Rocket | Rocket | Fuel line, engine and auxiliary devices | Diaphragm, O (square) ring, valve, tube, packing, hose, sealing material |
| | Ship | Ship | Fuel line | Diaphragm, O (square) ring, valve, tube, packing, hose, sealing material |
| Chemical | Chemical products | Plant | Production line of chemicals such as pharmaceutical, agricultural chemical, coating and resin (Petroleum) | Lining, valve, packing, roll, hose, diaphragm, O (square) ring, tube, sealing material |
| | Chemicals | Pharmaceuticals | Plug for chemicals | Plug for chemicals |
| Mechanical | Photograph | Developing machine | Film developing machine X-ray film developing machine | Roll Roll |
| | Printing | Printing machine | Printing roll | Roll |
| | Coating | Coating facilities | Coating roll | Roll |
| | Analyzer and physical and chemical appliances | | | Tube |
| Food | Plant | | Food processing line | Lining, valve, packing, roll, hose, diaphragm, O (square) ring, tube, sealing material |
| Metal | Steel making | Steel sheet processing facilities | Steel sheet processing roll | Roll |

TABLE 2

| Field of Industry | Characteristics Required |
|---|---|
| Electrical | Plasma resistance, acid resistance, alkali resistance, amine resistance, ozone resistance, gas resistance, chemical resistance, cleanliness, heat resistance |
| Transportation | Heat resistance, amine resistance |
| | Heat resistance, amine resistance |
| | Fuel resistance, fuel permeability, heat resistance |
| | Fuel resistance, fuel permeability, heat resistance |
| | Fuel resistance, fuel permeability, heat resistance |
| | Fuel resistance, fuel permeability, heat resistance |
| Chemical | Chemical resistance, solvent resistance, heat resistance, steam resistance |
| | Chemical resistance, solvent resistance, heat resistance |
| | Cleanliness |
| Mechanical | Chemical resistance |
| | Chemical resistance |
| | Solvent resistance |
| | Solvent resistance |
| Food | Chemical resistance, solvent resistance, heat resistance |
| Metal | Heat resistance, acid resistance |

TABLE 3

| Field of industry | Parts |
|---|---|
| Electrical | O ring and sealing material for gate valve of corresponding production equipment O ring and sealing material for quartz window of corresponding production equipment O ring and sealing material for chamber of corresponding production equipment O ring and sealing material for gate of corresponding production equipment O ring and sealing material for bell jar of corresponding production equipment O ring and sealing material for coupling of corresponding production equipment O ring and sealing material for pump of corresponding production equipment O ring and sealing material for gas controller for semi-conductor of corresponding production equipment O ring and sealing material for resist developing and releasing solutions O ring and sealing material for wafer cleaning solution Diaphragm of pump for corresponding production equipment Hose for resist developing and releasing solutions Hose and tube for wafer cleaning solution Roll for transferring wafer Lining and coating of tanks for resist developing |

TABLE 3-continued

| Field of industry | Parts |
|---|---|
| | and releasing solutions |
| | Lining and coating of tanks for wafer cleaning solution |
| | Lining and coating of tanks for wt etching |
| Transportation | Engine head gasket |
| | Metal gasket |
| | Crank shaft seal |
| | Cam shaft seal |
| | Valve stem seal |
| | Manifold packing |
| | Oil hose |
| | Seal for oxygen sensor |
| | ATF hose |
| | Injector O ring |
| | Injector packing |
| | O ring and diaphragm for fuel pump |
| | Fuel hose |
| Chemical | Sealing material for oil well excavator |
| Mechanical | Developing roll |
| | Developing roll |
| | Gravure roll |
| | Guide roll |
| | Gravure roll for magnetic tape production and coating line |
| | Guide roll for magnetic tape production and coating line |
| | Various coating rolls |
| Food | |
| Metal | |

Particularly the crosslinked product of the present invention can be used built-in the following semiconductor manufacturing equipment.
(1) Etching system
  Dry etching equipment
    Plasma etching machine
    Reactive ion etching machine
    Reactive ion beam etching machine
    Sputter etching machine
    Ion beam etching machine
  Wet etching equipment
  Ashing equipment
(2) Cleaning system
  Dry etching cleaning equipment
    UV/O$_3$ cleaning machine
    Ion beam cleaning machine
    Laser beam cleaning machine
    Plasma cleaning machine
    Gas etching cleaning machine
  Extractive cleaning equipment
    Soxhlet extractive cleaning machine
    High temperature high pressure extractive cleaning machine
    Microwave extractive cleaning machine
    Supercritical extractive cleaning machine
(3) Exposing system
  Stepper
  Coater and developer
(4) Polishing system
  CMP equipment
(5) Film forming system
  CVD equipment
  Sputtering equipment
(6) Diffusion and ion implantation system
  Oxidation and diffusion equipment
  Ion implantation equipment.

The crosslinked rubber molded article of the present invention is suitable as a sealing material used under temperature environment of not less than 300° C., particularly a sealing material for O$_2$ sensor of motor engine, a sealing material for airplane and space ship engines, a sealing material for oil well excavator, etc.

The present invention is then explained by means of examples, but is not limited to them.

PREPARATION EXAMPLE 1
(Synthesis of Cn Group-Containing Elastomer A)

A 3-liter stainless steel autoclave having no ignition source was charged with 1 liter of pure water, 10 g of:

as an emulsifying agent and 0.09 g of disodium phosphate 12H$_2$O as a pH control agent. After the inside of a system was sufficiently replaced with nitrogen gas and deairing was carried out, the autoclave was heated to 50° C. with stirring at 600 rpm, and a gas mixture of tetrafluoroethylene (TFE)/perfluoro(methyl vinyl ether) (PMVE) (TFE/PMVE=25/75 in mole ratio) was introduced so that the inside pressure became 0.78 MPa·G. Then 10 ml of an aqueous solution of ammonium persulfate (APS) having a concentration of 527 mg/ml was introduced with pressurized nitrogen gas to initiate a reaction.

With the advance of the polymerization, at the time when the inside pressure was lowered to 0.69 MPa·G, 3 g of CF$_2$=CFOCF$_2$CF(CF$_3$)OCF$_2$CF$_2$CN(CNVE) was introduced with pressurized nitrogen. Then 4.7 g of TFE and 5.3 g of PMVE were introduced at the respective self-pressures so that the inside pressure became 0.78 MPa·G. Thereafter with the advance of the reaction, pressurized TFE and PMVE were introduced similarly. Thus increasing and decreasing of the inside pressure were repeated between 0.69 MPa·G and 0.78 MPa·G, and in addition, 3 g of CNVE was introduced with pressurized nitrogen at the time when a total amount of the introduced TFE and PMVE reached 70 g, 130 g, 190 g and 250 g, respectively.

Nineteen hours after starting of the polymerization, when a total amount of the introduced TFE and PMVE reached 300 g, the autoclave was cooled and an un-reacted monomer was released to obtain 1,330 g of an aqueous dispersion having a solid concentration of 21.2% by weight.

Then 1,196 g of the obtained aqueous dispersion was diluted with 3,588 g of water and added slowly to 2,800 g of an aqueous solution of 3.5% by weight of hydrochloric acid with stirring. After the addition, stirring was continued for five minutes and then a coagulated product was filtrated. The obtained polymer was put in 2 kg of HCFC-141b, followed by stirring for five minutes and filtrating again. After that, the washing with HCFC-141b and the filtration were repeated four times and vacuum drying was carried out at 60C for 72 hours to obtain 240 g of a polymer (nitrile group-containing elastomer A).

As a result of $^{19}$F-NMR analysis, the obtained polymer was a polymer comprising TFE/PMVE/CNVE=56.6/42.3/1.1% by mole. Also as a result of measurement by infrared spectroscopic analysis, a chart shown in FIG. 1 was obtained.

In the chart of FIG. 1, a characteristic absorption of carboxyl group was recognized around 1,774.9 cm$^{-1}$ and 1,808.6 cm$^{-1}$ and a characteristic absorption of OH group was recognized around 3,557.5 cm$^{-1}$ and 3,095.2 cm$^{-1}$.

17

When an elastomer obtained by coagulation of the obtained product with magnesium chloride and ethanol was subjected to IR analysis for reference purpose, an absorption derived from carboxyl group was not present and an absorption of magnesium salt of carboxylic acid was recognized at 1,729 cm$^{-1}$.

Further when the coagulation was carried out by freeze coagulation (pH: 3.5 to 7.0) and the obtained elastomer was subjected to IR analysis similarly, an absorption derived from carboxyl group was not present and an absorption of ammonium salt (—COONH$_4$) of carboxylic acid was recognized at 1,651 cm$^{-1}$.

A value obtained from the equation (Sco/Scf)×(D/Dp)×(F/Fp) was 0.040.

PREPARATION EXAMPLE 2
(Synthesis of COOH Group-Containing Elastomer)

A 3-liter stainless steel autoclave having no ignition source was charged with 1 liter of pure water, 10 g of:

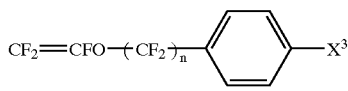

as an emulsifying agent and 0.09 g of disodium phosphate-12H$_2$O as a pH control agent. After the inside of a system was sufficiently replaced with nitrogen gas and deairing was carried out, the autoclave was heated to 50° C. with stirring at 600 rpm, and a gas mixture of tetrafluoroethylene (TFE)/perfluoro(methyl vinyl ether) (PMVE) (TFE/PMVE=25/75 in mole ratio) was introduced so that the inside pressure became 0.78 MPa·G. Then 10 ml of an aqueous solution of ammonium persulfate (APS) having a concentration of 527 mg/ml was is introduced with pressurized nitrogen gas to initiate a reaction.

With the advance of the polymerization, at the time when the inside pressure was lowered to 0.69 MPa·G, 1.89 g of CF$_2$=CFOCF$_2$CF(CF$_3$)OCF$_2$CF$_2$COOH (CBVE) was introduced with pressurized nitrogen. Then 4.7 g of TFE and 5.3 g of PMVE were introduced at the respective self-pressures so that the inside pressure became 0.78 MPa·G. Thereafter with the advance of the reaction, pressurized TFE and PMVE were introduced similarly. Thus increasing and decreasing of the inside pressure were repeated between 0.69 MPa·G and 0.78 MPa·G. 4.2 hours after starting of the polymerization reaction, when a total amount of the introduced TFE and PMVE reached 80 g, the autoclave was cooled and an un-reacted monomer was released to obtain 1,089 g of an aqueous dispersion having a solid concentration of 7.5% by weight.

Then 1,000 g of the obtained aqueous dispersion was diluted with 3,000 g of water and added slowly to 2,800 g of an aqueous solution of 3.5% by weight of hydrochloric acid with stirring. After the addition, stirring was continued for five minutes and then a coagulated product was filtrated. The obtained polymer was put in 800 g of HCFC-141b, followed by stirring for five minutes and filtrating again. After that, the washing with HCFC-141b and the filtration were repeated four times and vacuum drying was carried out at 120° C. for 72 hours to obtain 70 g of a polymer.

As a result of $^{19}$F-NMR analysis, the obtained polymer was a polymer comprising TFE/PMVE/CBVE=59.6/39.9/0.5% by mole. Also as a result of measurement by infrared spectroscopic analysis, a characteristic absorption of carboxyl group was recognized around 1,774.4 cm$^{-1}$ and a characteristic absorption of OH group was recognized around 3,557.0 cm$^{-1}$ and 3,087.7 cm$^{-1}$.

A value obtained from the equation (Sco/Scf)×(D/Dp)×(F/Fp) was 0.21.

18

PREPARATION EXAMPLE 3
(Synthesis of CN Group-Containing Elastomer B)

A 45-liter stainless steel autoclave having no ignition source was charged with 27 liter of pure water, 270 g of:

as an emulsifying agent and 2.4 g of disodium phosphate-12H$_2$O as a pH control agent. After the inside of a system was sufficiently replaced with nitrogen gas and deairing was carried out, the autoclave was heated to 50° C. with stirring at 200 rpm, and a gas mixture of tetrafluoroethylene (TFE)/perfluoro(methyl vinyl ether) (PMVE) (TFE/PMVE=25/75 in mole ratio) was introduced so that the inside pressure became 0.78 MPa·G. Then 473 ml of an aqueous solution of ammonium persulfate (APS) having a concentration of 0.3 g/ml was introduced with pressurized nitrogen gas to initiate a reaction.

With the advance of the polymerization, at the time when the inside pressure was lowered to 0.69 MPa·G, 15.3 g of CF$_2$=CFOCF$_2$CF(CF$_3$)OCF$_2$CF$_2$CN(CNVE) was introduced with pressurized nitrogen. Then 54 g of TFE and 60 g of PMVE were introduced at the respective self-pressures so that the inside pressure became 0.78 MPa·G. Thereafter with the advance of the reaction, pressurized TFE and PMVE were introduced similarly. Thus increasing and decreasing of the inside pressure were repeated between 0.69 MPa·G and 0.78 MPa·G. When a total amount of the introduced TFE and PMVE reached 550 g and 980 g, respectively and thereafter every time when the total amount increased by 430 g, 15.3 g of CNVE was introduced with pressurized nitrogen gas.

9.4 hours after starting of the polymerization, when the total amount of the introduced TFE and PMVE reached 7,000 g, the autoclave was cooled and an un-reacted monomer was released to obtain 34.8 kg of an aqueous dispersion having a solid concentration of 20.6% by weight.

The obtained aqueous dispersion was subjected to coagulating with hydrochloric acid and drying in the same manner as in Preparation Example 1 to obtain a polymer (nitrile group-containing elastomer B).

As a result of $^{19}$F-NMR analysis, the obtained polymer was a polymer comprising TFE/PMVE/CNVE=61.7/37.5/0.8% by mole.

PREPARATION EXAMPLE 4
(Synthesis of 2,2-bis[3-amino-4-(N-methylamino)phenyl]hexafluoropropane (AFTA-Me))

All the following reactions were carried out under nitrogen gas atmosphere, and all the reagents and solvents were those dehydrated.

In 50 ml of dichloromethane were dissolved 4.963 g (26.03 mmol) of p-toluenesulfonyl chloride and 4.623 g (10.85 mmol) of 2,2-bis(3-nitro-4-hydroxyphenyl) hexafluoropropane [Amino(bisphenol)AF]. The solution was cooled to 0° C. and 6.05 ml of triethylamine was added dropwise into the solution. After the addition, stirring was continued at 0° C., and one hour later, the solution temperature was restored to room temperature and the solution was stirred for three hours.

With the advance of the reaction, crystals were precipitated. To the reaction solution was added 30 ml of dilute hydrochloric acid, and the crystals were collected by filtration. After the filtrated product was washed with water and then with a 50% aqueous solution of methanol, re-crystallization (hexane/THF) was carried out to obtain 6.3 g (yield: 80%) of 2,2-bis-(3-nitro-4-tosyloxyphenyl) hexafluoropropane as light-yellow crystals.

3 g (4.08 mmol) of 2,2-bis-(3-nitro-4-tosyloxyphenyl)hexafluoropropane was dissolved in 70 ml of butyl acetate, followed by moderately heating and refluxing. Then 5.26 ml (40.8 mmol) of n-methylbenzylamine was added dropwise into the solution, and after heating and refluxing were continued for 12 hours, the solution was cooled to room temperature. After 20 ml of dilute hydrochloric acid was added and extraction with ethyl acetate was carried out two times, an organic layer was washed with dilute hydrochloric acid, an aqueous solution of sodium hydrogencarbonate and saturated brine. After the washed organic layer was dried with anhydrous magnesium sulfate, the solvent was distilled off under reduced pressure. The obtained liquid product was separated by silica gel chromatography (hexane/ethyl acetate=4/1, hexane/dichloromethane=1/1) to obtain 2.1 g (yield: 81%) of 2,2-bis-[3-nitro-4(N-methyl-N-benzylamino)phenyl]hexafluoropropane in the form of yellow solid.

Then 10 g (15.8 mmol) of the obtained 2,2-bis-[3-nitro-4(N-methyl-N-benzylamino)phenyl]hexafluoropropane was dissolved in 150 ml of methanol and thereto was added 500 mg of 20% palladium hydroxide on carbon, and then replaced by hydrogen, followed by stirring vigorously at room temperature under hydrogen atmosphere for 48 hours. After the reaction solution was filtrated with Celite to filtrate off the catalyst, methanol was distilled off.

The obtained liquid product was separated by silica gel column chromatography (hexane/ethyl acetate=4/1) to obtain a crude product. This product was dissolved in 50 ml of diethylether and thereto was gradually added 1N hydrochloric acid-diethylether solution. The precipitated hydrochloric acid salt was filtrated, washed with diethylether and then dissolved in 100 ml of water. Thereto was added dropwise 14% aqueous ammonia under nitrogen atmosphere until a pH value became 7. A precipitate was filtrated, washed with deaerated water strongly and then dried at 35° C. under reduced pressure until a weight became constant to obtain 4.5 g (yield: 72%) of 2,2-bis[3-amino-4-(N-methylamino)phenyl]hexafluoropropane in the form of white solid.

The following physical properties of the obtained product were determined.

Melting point: 67.1° to 70.2° C. (purity: 94%)

$^1$H-NMR (in CDCl$_3$): δ(ppm)=6.57 to 6.98 (6H, m, aromatic ring), 2.80 to 3.40 (4H, broad, NH$_2$), 2.838 (6H, s, CH$_3$)

$^{19}$F-NMR (in CDCl$_3$): δ(ppm)=−64.8 (s, CF$_3$)

IR (KBr): cm$^{-1}$=3,337 to 3,147 (broad, strong, NH$_2$, NH), 1,270 to 1,140 (broad, strong, CF$_3$)

MS m/z=392 (m+), 291

HRMS: C$_{17}$H$_{18}$F$_6$N$_4$ (m+)

Calculated value=392.144

Measured value: 392.145.

EXAMPLE 1

The fluorine-containing elastomer having nitrile group and carboxyl groups at ends thereof which was obtained in Preparation Example 1, 2,2-bis[3-amino-4-(N-phenylamino)phenyl]hexafluoropropane (AFTA-Ph) which is a crosslinking agent synthesized by the above-mentioned process described in Journal of Polymer Science, edited by Polymer Chemistry, Vol. 20, pp. 2381 to 2393 (1982), and carbon black (Thermax N-990 available from Cancarb Co., Ltd.) as a filler were mixed in a weight ratio of 100/2.83/20, and the mixture was kneaded with an open roll to obtain a crosslinkable fluorine-containing rubber composition.

After the fluorine-containing rubber composition was subjected to crosslinking by pressing at 180° C. for 10 minutes, further a two-staged crosslinking in an oven was carried out at 204° C. for 18 hours and then at 288° C. for 18 hours. Thus a 2 mm thick crosslinked product and a sample O-ring (AS-568A-214) were produced. The results of measurements such as crosslinkability, physical properties in normal state, heat resistance and compression set of the crosslinked product are shown in Table 4.

(Crosslinkability)

Vulcanization curves of each composition for crosslinking are obtained at a temperature shown in Table 4 with JSR Curastometer Model II and then a minimum viscosity (v min), maximum viscosity (v max), induction time (T$_{10}$) and optimum vulcanization time (T$_{90}$) are obtained.

(Physical Properties in Normal State)

A 100% modulus, tensile strength, elongation and hardness (IRHD) of a 2 mm thick crosslinked product in normal state (25° C.) are measured according to JIS K6301.

(Heat Resistance)

After the crosslinked product is heated at 300° C. for 70 hours, a 100% modulus, tensile strength, elongation and hardness (IRHD) of a 2 mm thick crosslinked product in normal state (25° C.) are measured according to JIS K6301. Further a ratio of variation from the physical properties in normal state (variation rate) is calculated.

(Compression Set)

A compression set of the O-ring (AS-568A-214) is measured according to JIS K630I after allowing to stand at 300° C. for 70 hours and at 300° C. for 168 hours, respectively.

EXAMPLE 2

A crosslinkable composition and crosslinked product were produced in the same manner as in Example 1 except that the fluorine-containing elastomer having COOH group which was prepared in Preparation Example 2 was used as an elastomer and the crosslinking by pressing was carried out at 200° C. for 80 minutes. Physical properties were measured in the same manner as in Example 1. The results are shown in Table 4.

EXAMPLE 3

A crosslinkable composition and crosslinked product were produced in the same manner as in Example 2 except that 2,2-bis[3-amino-4-(N-methylamino)phenyl]hexafluoropropane obtained in Preparation Example 3 was used as a crosslinking agent, an adding amount of the crosslinking agent was 2.18 parts by weight and the crosslinking by pressing was carried out at 200° C. for 35 minutes. Physical properties were measured in the same manner as in Example 1. The results are shown in Table 4.

COMPARATIVE EXAMPLE 1

A crosslinkable composition and crosslinked product were produced in the same manner as in Example 1 except that 2,2-bis(3,4-diaminophenyl)hexafluoropropane (AFTA) was used as a crosslinking agent and an adding amount thereof was 2 parts by weight. Physical properties were measured in the same manner as in Example 1. The results are shown in Table 4.

COMPARATIVE EXAMPLE 2

A crosslinkable composition and crosslinked product were produced in the same manner as in Example 2 except that 2,2-bis(3,4-diaminophenyl)hexafluoropropane (AFTA) was used as a crosslinking agent and an adding amount thereof was 2 parts by weight. Physical properties were measured in the same manner as in Example 2. The results are shown in Table 4.

TABLE 4

|  | Ex. 1 | Ex. 2 | Ex. 3 | Com. Ex. 1 | Com. Ex. 2 |
|---|---|---|---|---|---|
| Components of composition | | | | | |
| CN-containing elastomer A | 100 | | | 100 | |
| COOH-containing elastomer | | 100 | 100 | | 100 |
| AFTA-Ph | 2.83 | 2.83 | | | |
| AFTA-Me | | | 2.18 | | |
| AFTA | | | | 2 | 2 |
| Carbon black | 20 | 20 | 20 | 20 | 20 |
| Crosslinkability (200° C.) | | | | | |
| Minimum viscosity (kgf) | 0.24 | 0.27 | 0.21 | 0.39 | 0.47 |
| (N) | (2.35 N) | (2.65 N) | (2.06 N) | (3.82 N) | (4.61 N) |
| Maximum viscosity (kgf) | 3.21 | 1.90 | 1.31 | 4.42 | 2.82 |
| (N) | (31.46 N) | (18.62 N) | (12.84 N) | (43.32 N) | (27.64 N) |
| Induction time (min) | 2.5 | 3.0 | 3.4 | 1.0 | 1.9 |
| Optimum vulcanization time (min) | 6.2 | 78.8 | 33.5 | 3.7 | 27.0 |
| Physical properties in normal state | | | | | |
| 100% modulus (MPa) | 10.4 | 7.9 | 7.9 | 17.8 | 7.6 |
| Tensile strength (MPa) | 19.2 | 16.7 | 17.5 | 20.9 | 20.2 |
| Elongation (%) | 149 | 174 | 186 | 107 | 195 |
| Hardness (IRHD) | 68 | 68 | 67 | 76 | 68 |
| Heat resistance (300° C. × 70 hours) | | | | | |
| 100% modulus (MPa) | 12.3 | 7.7 | — | 14.0 | 5.6 |
| Variation rate (%) | (+18.9%) | (−3.2%) | (—) | (−21.4%) | (−27.2%) |
| Tensile strength (MPa) | 19.0 | 19.7 | — | 18.2 | 12.6 |
| Variation rate (%) | (−1.0%) | (+18.2%) | (—) | (−12.7%) | (−37.4%) |
| Elongation (%) | 129 | 174 | — | 119 | 228 |
| Variation rate (%) | (−13.4%) | (+1.1%) | (—) | (+11.2%) | (+16.9%) |
| Hardness (IRHD) | 67 | 68 | — | 72 | 66 |
| Compression set | | | | | |
| 300° C. × 70 hours (%) | — | 42 | — | — | 44 |
| 300° C. × 168 hours (%) | — | 45 | — | — | 60 |

—: Not measured

As shown in Table 4, the crosslinked product having excellent heat resistance can be obtained when the crosslinking agent of the present invention is used.

EXAMPLES 4 to 6

A crosslinkable composition and crosslinked product were produced in the same manner as in Example 1 except that the CN-containing elastomer B obtained in Preparation Example 3 was used as a CN-containing elastomer, carbon black (Thermax N-990 available from Cancarb Co., Ltd., Example 4), SiO$_2$ (CABOCYL M-7D available from Cabot Co., Ltd., Example 5) and TiO$_2$ (TM-1 available from Fuji Titanium Kogyo Kabushiki Kaisha, Example 6) were used as a filler, and adding amounts thereof were as shown in Table 5. Physical properties were measured in the same manner as in Example 1. The results are shown in Table 5.

COMPARATIVE EXAMPLE 3

A crosslinkable composition and crosslinked product were produced in the same manner as in Example 4 except that 2,2-bis(3,4-diaminophenyl)hexafluoropropane (AFTA) was used as a crosslinking agent and an adding amount thereof was 2 parts by weight. Physical properties were measured in the same manner as in Example 4. The results are shown in Table 5.

TABLE 5

|  | Ex. 4 | Ex. 5 | Ex. 6 | Com. Ex. 3 |
|---|---|---|---|---|
| Components of composition | | | | |
| CN-containing elastomer B | 100 | 100 | 100 | 100 |
| AFTA-Ph | 2.83 | 2.83 | 2.83 | |
| AFAP | | | | 2 |
| Carbon black | 20 | | | 20 |
| SiO$_2$ | | 10 | | |
| TiO$_2$ | | | 30 | |
| Crosslinkability (200° C.) | | | | |
| Minimum viscosity (kgf) | 0.21 | 0.26 | 0.20 | 0.47 |
| Maximum viscosity (kgf) | 2.78 | 2.19 | 1.92 | 2.82 |
| Induction time (min) | 2.7 | 3.5 | 4.3 | 1.9 |
| Optimum vulcanization time (min) | 6.1 | 10.8 | 16.9 | 27.0 |
| Physical properties in normal state | | | | |
| 100% modulus (MPa) | 7.1 | 4.8 | 4.2 | 7.6 |
| Tensile strength (MPa) | 15.8 | 13.4 | 13.1 | 20.2 |
| Elongation (%) | 157 | 196 | 176 | 195 |
| Hardness (IRHD) | 76 | 77 | 69 | 68 |
| Compression set | | | | |
| 300° C. × 70 hours (%) | 71 | 42 | 32 | — |
| 300° C. × 168 hours (%) | 88 | 45 | 52 | — |

—: Not measured

EXAMPLE 7 and COMPARATIVE EXAMPLE 4

With respect to the crosslinked products produced in Example 4 and Comparative Example 3, ethylenediamine resistance and steam resistance of them were evaluated. The results are shown in Table 6.

(Ethylenediamine Resistance)

A sample was produced from the sheet-like crosslinked product and was dipped in ethylenediamine at 100° C. for 168 hours to measure variations (%) of volume and weight according to JIS K630 I.

(Steam Resistance)

A 3 mm×2 mm×20 mm crosslinked product was used as a sample. After measuring the weight and specific weight of the sample, the sample was put in a 4-ml stainless steel pressure resistant vessel with 1 g of water, and the vessel was sealed. After heating the inside of the vessel to 288° C. and allowing to stand for 168 hours, the inside temperature of the vessel was restored to room temperature. The weight and specific weight of the sample were measured to obtain variations (%) of weight and volume after treating with steam.

TABLE 6

| | Ethylenediamine resistance (100° C. × 168 hours) | | Steam resistance (288° C. × 168 hours) | |
|---|---|---|---|---|
| | Variation of weight (%) | Variation of volume (%) | Variation of weight (%) | Variation of volume (%) |
| Ex. 7 | +8 | +15 | −1.4 | −1.0 |
| Com. Ex. 4 | +51 | +109 | +8 | +69 |

INDUSTRIAL APPLICABILITY

The present invention can provide a novel crosslinkable elastomer composition and crosslinking agent from which a crosslinked rubber molded article having excellent chemical resistance and mechanical strength and possessing enhanced heat resistance, particularly heat resistance at high temperatures can be obtained.

What is claimed is:

1. An elastomer composition for crosslinking which comprises (A) a compound having at least two crosslinkable reactive groups represented by the formula (I):

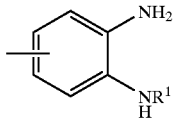

wherein $R^1$ in each of the at least two crosslinkable reactive groups is the same or different and each is fluorine atom or a monovalent organic group, and (B) an elastomer having a curing site capable of reacting with the crosslinkable reactive group (I).

2. The composition of claim 1, wherein the compound (A) is a compound represented by the formula (II):

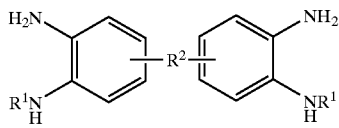

in which $R^1$ is as defined above, wherein $R^2$ is —SO$_2$—, —O—, —CO—, an alkylene group which may have been substituted,

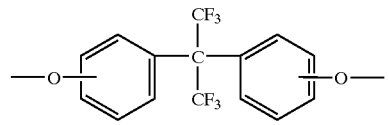

or a single bond.

3. The composition of claim 2, wherein in the formula (II), $R^2$ is a non-substituted alkylene group having 1 to 6 carbon atoms or a perfluoro alkylene group having 1 to 10 carbon atoms.

4. The composition of claim 3, wherein in the formula (II), $R^2$ is:

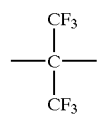

5. A crosslinking agent comprising a compound (A) having at least two crosslinkable reactive groups represented by the formula (I):

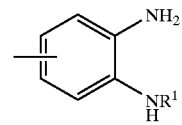

wherein $R^1$ in each of the at least two crosslinkable reactive groups is the same or different and each is fluorine atom or a monovalent organic group.

6. The crosslinking agent of claim 5, wherein the compound (A) is a compound represented by the formula (II):

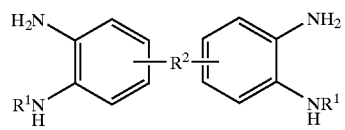

in which $R^1$ is as defined above, wherein $R^2$ is —SO$_2$—, —O—, —CO—, an alkylene group which may have been substituted,

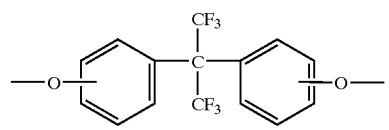

or a single bond.

7. The crosslinking agent of claim 6, wherein in the formula (II), $R^2$ is a non-substituted alkylene group having 1 to 6 carbon atoms or a perfluoro alkylene group having 1 to 10 carbon atoms.

8. The crosslinking agent of claim 7, wherein in the formula (II), R² is:

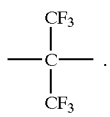

9. A compound represented by the formula (III):

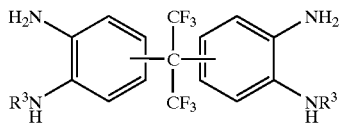

wherein R³ is an alkyl group which has 1 to 6 carbon atoms and may have been substituted.

10. A crosslinked rubber molded article obtained by crosslinking the elastomer composition for crosslinking of claim 1.

11. The composition of claim 1, wherein in the formula (I), the N—R¹ bond has a higher anti-oxidizing property than the N—H bond.

12. The composition of claim 1, wherein in the formula (I), R¹ is an aliphatic hydrocarbon group which may have been substituted or a benzyl group or phenyl group which may have been substituted.

13. The composition or claim 1, wherein in the formula (I), at least one of R¹ is an alkyl group having 1 to 10 carbon atoms or an alkyl group having fluorine atom and 1 to 10 carbon atoms.

14. The composition of claim 1, wherein in the formula (I), at least one of R¹ is a phenyl group, a benzyl group, or a benzyl group or phenyl group in which 1 to 5 hydrogen atoms have been substituted by fluorine atom or —CF₃.

15. The composition of claim 1, wherein the elastomer (B) has a nitrile group, carboxyl group and/or alkoxycarbonyl group as a curing site.

16. The composition of claim 1, wherein the elastomer (B) is a fluorine-containing elastomer.

17. The composition of claim 16, wherein the fluorine-containing elastomer (B) is a perfluoro elastomer.

18. The composition of claim 2, wherein in the formula (II), the N—R¹ bond has a higher anti-oxidizing property than the N—H bond.

19. The composition of claim 2, wherein in the formula (II), R¹ is an aliphatic hydrocarbon group which may have been substituted or a benzyl group or phenyl group which may have been substituted.

20. The composition of claim 2, wherein in the formula (II), at least one of R¹ is an alkyl group having 1 to 10 carbon atoms or an alkyl group having fluorine atom and 1 to 10 carbon atoms.

21. The composition of claim 2, wherein in the formula (II), at least one of R¹ is a phenyl group, a benzyl group, or a benzyl group or phenyl group in which 1 to 5 hydrogen atoms have been substituted by fluorine atom or —CF₃.

22. The composition of claim 2, wherein the elastomer (B) has a nitrile group, carboxyl group and/or alkoxycarbonyl group as a curing site.

23. The composition or claim 2, wherein the elastomer (B) is a fluorine-containing elastomer.

24. The composition of claim 23, wherein the fluorine-containing elastomer (B) is a perfluoro elastomer.

25. The crosslinking agent of claim 5, wherein in the formula (I), R¹ is an aliphatic hydrocarbon group which may have been substituted or a benzyl group or phenyl group which may have been substituted.

26. The crosslinking agent of claim 5, wherein in the formula (I), at least one of R¹ is an alkyl group having 1 to 10 carbon atoms or an alkyl group having fluorine atom and 1 to 10 carbon atoms.

27. The crosslinking agent of claim 5, wherein in formula (I), at least one of R¹ is a phenyl group, a benzyl group, or a benzyl group or phenyl group in which 1 to 5 hydrogen atoms have been substituted by fluorine atom or —CF₃.

28. The crosslinking agent of claim 6, wherein in the formula (II), R¹ is an aliphatic hydrocarbon group which may have been substituted or a benzyl group or phenyl group which may have been substituted.

29. The crosslinking agent of claim 6, wherein in the formula (II), at least one of R¹ is an alkyl group having 1 to 10 carbon atoms or an alkyl group having fluorine atom and 1 to 10 carbon atoms.

30. The crosslinking agent of claim 6, wherein in the formula (II), at least one of R¹ is a phenyl group, a benzyl group, or a benzyl group or phenyl group which 1 to 5 hydrogen atoms have been substituted by fluorine atom or —CF₃.

* * * * *